(No Model.)
A. G. PERRY.
CULTIVATOR.
No. 495,365. Patented Apr. 11, 1893.
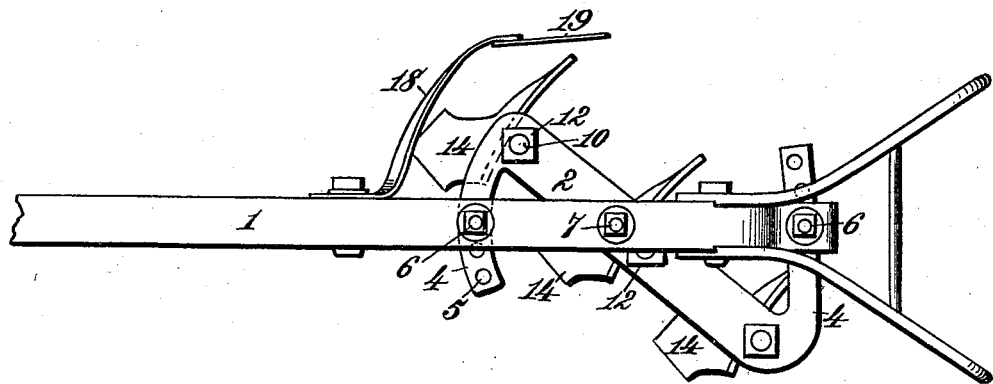
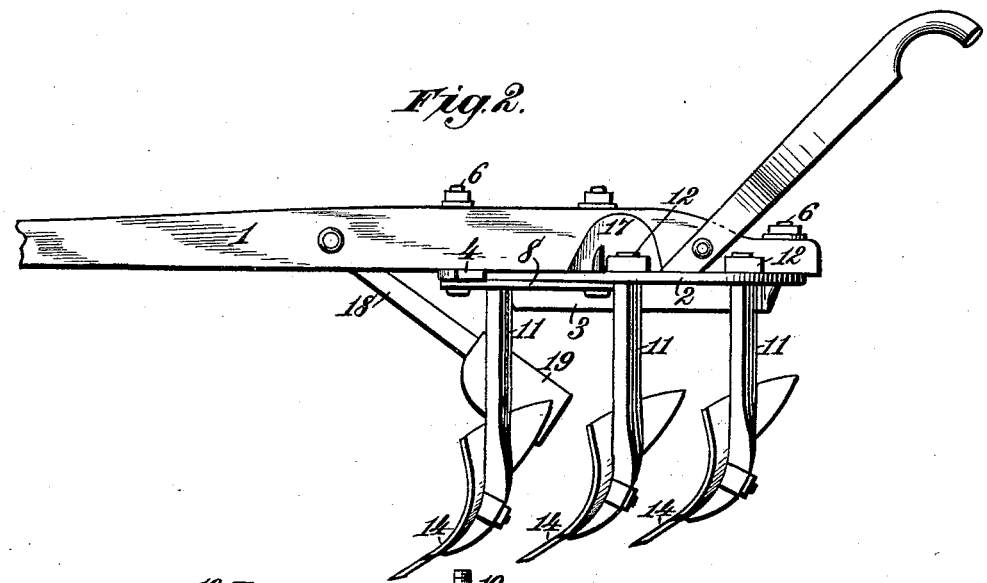
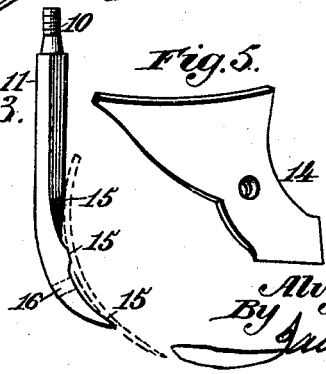
Witnesses.
Inventor:
Alvy G. Perry.

UNITED STATES PATENT OFFICE.

ALVY G. PERRY, OF COLDWATER, MISSISSIPPI.

CULTIVATOR.

SPECIFICATION forming part of Letters Patent No. 495,365, dated April 11, 1893.

Application filed June 16, 1892. Serial No. 436,891. (No model.)

*To all whom it may concern:*

Be it known that I, ALVY G. PERRY, a citizen of the United States, residing at Coldwater, in the county of Tate and State of Mississippi, have invented new and useful Improvements in Cultivators, of which the following is a specification.

This invention relates to cultivators and consists in certain peculiarities of construction and novel combinations of parts as hereinafter particularly described and claimed.

In the annexed drawings illustrating the invention—Figure 1 is a plan of a cultivator embodying my improvements. Fig. 2 is a side elevation of the same. Figs. 3 and 4 are views of plow standards. Figs. 5 and 6 are views of plow shovels or points.

Referring to the drawings, the numeral 1 designates the plow-beam which may be provided with the usual handles and draft devices.

Secured to the under side of the plow-beam, in advance of the handles, is an adjustable diagonally arranged angle-iron or Z shaped cross-bar 2 for attachment of the plow standards. This angle-iron or cross-bar 2 is provided along its rear edge with a depending flange or rib 3 whereby the said angle-iron or cross-bar is securely braced and prevented from twisting, buckling or turning under any strains incident to contact of the plow points with hard substances in the soil. The Z shaped cross-bar 2 is provided at both ends with curved arms 4 that project in reverse directions as shown in Fig. 1. In each of these arms is a series of perforations 5 for passage of a bolt 6 by which the said cross-bar or Z shaped frame can be adjustably secured to the plow beam. The rear arm, which is preferably the longer, is secured in the manner just described to the rear end of the plow beam as shown in Figs. 1 and 2 while the front arm is secured in like manner to the plow beam in advance of the central bolt 7 on which the said Z shaped cross bar can be adjusted after first withdrawing the bolts 6 that secure its ends.

On the under side of the Z shaped diagonally arranged angle-iron or cross-bar 2 and connecting the forward bolt 6 and central bolt 7 is a brace bar 8 to prevent the crossbar or angle-iron from twisting down in front when the plows are subjected to a hard strain.

At suitable intervals in the length of the angle-iron or cross-bar 2 are openings 9 to receive the screw threaded shanks 10 of the plow standards 11 which are secured in place by nuts 12 located on the upward projecting portions of said screw shanks. As shown in Fig. 3 the shanks 10 may be tapered to bind tightly in the openings 9, or as shown in Fig. 4 the upper portion of each standard 11, immediately below its shank 10, may be formed with an enlargement, flange or shoulder 13 adapted to have a rigid bearing against the under side of the angle-iron or cross-bar 2 when the nut 12 is turned tightly down. Each plow standard 11 is formed with a twist that is so arranged as to bring one of its corners in front for a distance extending from about the upper edge of the attached plow point or shovel to the upper end of the standard. The lower end of the plow standard is curved to correspond with the curvature of the plow points or shovels, 14, as shown. The plow points or shovels 14 may be secured to the standards by bolts, rivets or otherwise, as preferred. The front lower portion of each plow standard is so formed as to provide three bearings 15 for the plows, shovels or points, two of said bearings being located above the bolt hole 16 and one below said hole, as shown. By this construction either a turning wing or shovel shaped plow as shown in Fig. 5, or a flat shovel, as Fig. 6, can be readily used on the same standard. For the purpose of equalizing the strength of the plow standard it may be made larger at its upper end and gradually tapered downward as shown in Fig. 4. By this construction the standard is prevented from bending or breaking at its upper end when subjected to strain.

For permitting attachment of the central portion of the angle-iron or cross-bar 2 to the plow-beam 1 and at the same time afford room for the nut 12 that secures the central plow standard in place a notch or concaved recess 17 is formed in one side of the plow-beam. By reason of this notch or recess the plow beam can be arranged very nearly in line with the center of the angle-iron or cross-bar without interfering with adjustment of the nut 12 which must be turned down firmly onto the cross-bar 2 so as to secure the central plow standard in place.

It will be observed that the several plow standards are of different lengths and that the longest is arranged in front and the shortest at the rear of the machine. This arrangement of standards varying in length enables each plow to have the proper depth of dip into the soil to correspond with the pitch or inclination of the beam thereby causing all the plows to run an equal depth in the ground, when at work.

It is obvious that the cultivator can be used as a single, double or triple plow by removing either or both the front and rear standards, as required. By means of the bolts 6, each engaged in one of the series of perforations 5 of the arms 4 at the ends of the Z shaped diagonally arranged angle-iron or cross-bar 2 the said bar can be readily adjusted to any desired inclination with relation to the plow beam to vary the working distance between the plows, and by loosening the nuts 12 each plow can be adjusted to any desired position.

Attached to one side of the plow beam 1, in front of the Z shaped diagonally arranged angle-iron or cross-bar 2 is a rearwardly and outwardly curved arm 18 carrying at its rear end a fender 19 which is located above and to the outside of the forward plow in such a manner as to prevent the said plow from covering small plants, in plowing.

I am aware that pivoted cross-bar cultivators are not new and, therefore, I do not claim such broadly.

My invention is distinguished from others in comprising a Z shaped cross bar or frame having a rib or flange along the under side of its rear edge and in the manner of arranging and connecting the several parts of the cultivator whereby its strength, efficiency and durability are greatly increased.

What I claim as my invention is—

In a cultivator, the combination with the plow beam, of a Z shaped diagonally arranged cross-bar having a rib or flange along the under side of its rear edge and provided at its opposite ends with reversely projecting arms secured to said plow-beam, a brace connecting the forward and central portions of said cross-bar, twisted plow standards of varying length secured to said cross-bar, the longest standard being in front and the shortest at the rear, and a fender connected with the forward portion of the beam on one side and projecting above and outside the forward plow, substantially as shown and described.

In testimony whereof I have hereunto set my hand and affixed my seal in presence of two subscribing witnesses.

ALVY G. PERRY. [L. S.]

Witnesses:
SAM OWEN EMERSON,
SAM J. HOUSE.